United States Patent [19]

Voirin

[11] 4,399,112
[45] Aug. 16, 1983

[54] PROCESS FOR THE CATALYTIC INCINERATION OF RESIDUAL GASES CONTAINING A LOW CONTENT OF AT LEAST ONE SULFUR COMPOUND SELECTED FROM COS, CS₂ AND THE MERCAPTANS AND POSSIBILITY AT LEAST ONE MEMBER OF THE GROUP

[75] Inventor: Robert Voirin, Mourenx, France

[73] Assignee: Societe Nationale Elf Aquitaine, Paris, France

[21] Appl. No.: 255,995

[22] Filed: Apr. 21, 1981

[30] Foreign Application Priority Data

Apr. 23, 1980 [FR] France ............................. 80 09129

[51] Int. Cl.³ ............................................ B01D 53/36
[52] U.S. Cl. .................... 423/230; 423/231; 423/244; 423/539; 423/564
[58] Field of Search ............... 423/230, 231, 244, 539, 423/564

[56] References Cited

U.S. PATENT DOCUMENTS

| 1,900,751 | 3/1933 | Baehr ............................... 423/539 X |
| 2,083,894 | 6/1937 | Connolly ........................ 423/230 X |
| 4,012,486 | 3/1977 | Singleton ........................ 423/539 X |
| 4,123,507 | 10/1978 | Hass ................................. 423/573 G |
| 4,233,276 | 11/1980 | D'Sousa et al. ................. 423/539 X |
| 4,277,458 | 7/1981 | Sugler et al. ................... 423/539 X |

FOREIGN PATENT DOCUMENTS 769996  3/1957  United Kingdom ................ 423/539

*Primary Examiner*—Earl C. Thomas
*Attorney, Agent, or Firm*—Burgess, Ryan & Wayne

[57] ABSTRACT

A process for the catalytic incineration of residual gases containing a low content of $H_2S$ and/or $SO_2$, organic compounds of sulfur such as COS, $CS_2$, mercaptans and possibly vapor and/or vesicular sulfur, comprising a hydrogenation stage which transforms all the sulfur compounds into $H_2S$ followed by a catalytic oxidation stage to transform $H_2S$ into $SO_2$.

The catalyst used in the oxidation stage consists in a porous support, having a surface area of at least 5 m²/g and containing, by weight, 50 to 100% of a product selected from the group comprising titanium or zirconium oxides, silica and zeolites, and 50 to 0% alumina, to which is associated one or several compounds of metals belonging to the group formed by Cu, Ag, Zn, Cd, Y, Lanthanides, V, Cr, Mo, W, Mn, Fe, Co, Rh, Ir, Ni, Pd, Pt, Sn and Bi. The use of such an oxidation catalyst leads to a practically quantitative yield of conversion of $H_2S$ into $SO_2$, this yield being maintained steadily throughout the process.

17 Claims, No Drawings

PROCESS FOR THE CATALYTIC INCINERATION OF RESIDUAL GASES CONTAINING A LOW CONTENT OF AT LEAST ONE SULFUR COMPOUND SELECTED FROM COS, CS₂ AND THE MERCAPTANS AND POSSIBILITY AT LEAST ONE MEMBER OF THE GROUP

BACKGROUND OF THE INVENTION

The present invention relates to a process for the catalytic incineration of residual gases containing a low content of at least one sulfur compound selected from COS and $CS_2$, and mercaptans, and possibly at least one member of the group formed by $H_2S$, $SO_2$, vapor and/or vesicular sulfur. It also relates more especially to a process for the catalytic incineration of residual gases issuing from CLAUS units in the preparation of sulfur.

Various industrial operations give rise to residual gases containing a low content of $H_2S$ and/or $SO_2$ as well as other sulfur compounds such as COS and/or $CS_2$, and/or mercaptans, and possibly vapor and/or vesicular sulfur. Especially residual gases issuing from a unit sulfur manufacture by the gentle oxidation process with hydrogen sulfide, known as the CLAUS process, contain about 0.5 to 2% by volume of sulfur compounds, a high proportion of which consists of $H_2S$, the remainder being formed of $SO_2$, COS, $CS_2$ and vapor and/or vesicular sulfur.

To comply with the most stringent standards imposed by legislation covering atmospheric pollution, these residual gases are subjected to thermal incineration before being rejected into the atmosphere. The purpose of this incineration is to transform into $SO_2$ the sulfur compounds such as $H_2S$, COS, $CS_2$ and vapor and/or vesicular sulfur, since rejection into the atmosphere of $SO_2$ is not subject to as strict limitations as those imposed on the rejection of other sulfur compounds in the form of gaseous sulfur, especially $H_2S$, COS and $CS_2$.

In this thermal incineration step, the residual gas to be incinerated is placed in contact with a suitable quantity of a gas containing oxygen, usually air, and at a temperature sufficient to provoke oxidation into $SO_2$ of vapor and/or vesicular sulfur as well as gaseous sulfides, namely $H_2S$, COS and $CS_2$, which are present in the residual gas. The calories necessary to maintain the temperature in the incineration zone at an appropriate level are produced by combustion of a suitable combustible gas injected in the incineration zone at the same time as the air and the residual gas to be incinerated. During operation of this thermal incineration high energy is consumed since it is necessary to operate at high temperature most often in the order of 700° to 800° C., to transform into $SO_2$ all the oxidable sulfur compounds present in the residual gas subjected to the incineration.

With the aim of reducing energy consumption needed by the thermal incineration, it was proposed to incinerate catalytically the residual gases containing $H_2S$ and possibly other oxidable sulfur compounds into $SO_2$ by bringing the residual gas in contact with a gas containing oxygen in the presence of an appropriate catalyst and at a temperature in the range of 200° to about 550° C. The catalyst used is most often formed by an alumina support or matrix impregnated with a metal compound, such as for example copper, zinc, iron, cobalt, nickel, manganese, possibly associated to a metal or metalloid compound of groups IV to VI of the Periodic Table. A process of this type is described in F.P.A. No. 78.00205 of Jan. 5, 1978 (Pub. No. 2 376 686) the said process using a catalyst comprising an alumina support or matrix impregnated with copper and bismuth compounds. In these catalytic incineration processes as in the thermal incineration but at a lower temperature, is carried out a $SO_2$ oxidation of hydrogen sulfide and possibly other oxidable sulfur compounds present in the residual gas, after, in certain cases, the said residual gas having been subjected to a hydrogenation treatment to transform all the sulfur compounds contained in said gas into $H_2S$ which compound is easily oxidable in $SO_2$.

Although these catalytic incineration processes permit operation with an energy consumption clearly lower than the thermal incineration, they are not entirely satisfactory since the oxidation catalysts on the alumina support or matrix used for the transformation into $SO_2$ of the hydrogen sulfide and possibly other sulfur compounds such as COS, $CS_2$, vapor and/or vesicular sulfur rapidly deactivate, thus after a life-span of the said catalysts which is relatively short on the industrial level, leading to a sharp decrease in the rate of conversion into $SO_2$ of the sulfur compounds contained in the treated residual gas. This results in risks of rejection into the atmosphere of highly polluting sulfur compounds, such as for example $H_2S$, in concentrations higher than those stipulated by the current standards covering atmospheric pollution. Thus for a catalyst comprising an alumina support impregnated with an iron compound, the conversion rate of $SO_2$ into hydrogen sulfide, which was originally equal to 100% drops to 75% after 4000 hours use, a relatively short life-span on the industrial scale.

The present invention relates to a process analogous to the hereinabove processes, with a prior hydrogenation, for the catalyst incineration of residual gases containing at least one sulfur compound selected from among COS, $CS_2$, mercaptans, and possibly at least one member of a group formed by $H_2S$, $SO_2$, vapor and/or vesicular sulfur which however allows the drawbacks of the said processes to be overcome by providing means of achieving oxidation of $H_2S$ into $SO_2$ with a conversion rate maintained throughout at a steady level substantially equal to 100%.

The process according to the invention for the catalytic incineration of residual gases containing a low content of at least one sulfur compound selected from among COS, $CS_2$, mercaptans and possibly at least one member of the group formed by $H_2S$, $SO_2$, vapor and/or vesicular sulfur, is of the type comprising a first stage in which the residual gas is subjected to a hydrogenation treatment with the aim of obtaining sulfur compounds it contains in the sole form of $H_2S$, and a second stage in which the gaseous effluent of the hydrogenation treatment is placed in contact with an appropriate quantity of a gas containing oxygen, at a temperature comprised between about 150° C. and 570° C. and in the presence of oxidation catalyst of $H_2S$ into $SO_2$, wherein the oxidation catalyst is formed of a porous support or matrix having a surface area at least equal to 5 m²/g and constituted of 50 to 100% by weight of at least one compound selected from among silica, zeolites, titanium oxides (expressed as $TiO_2$), and zirconium oxides (expressed as $ZrO_2$) and from 50 to 0% by weight of alumina, to which are associated one or several compounds of metals belonging to the group constituted by copper, silver, zinc, cadmium, yttrium, lanthanides, vanadium, chromium, molybdenum, tungsten, manganese, iron, cobalt, nickel, rhodium, iridium, palladium, platinum, tin, and bismuth, the oxidation catalyst support or matrix always containing a titanium oxide and/or a zirconium oxide when a copper compound and a bismuth compound are jointly associated to the support or matrix as compounds of the metals of the said group.

During the first stage of the following process according to the invention, sulfur compounds such as $SO_2$, $CS_2$, COS, mercaptans, as well as vapor and/or vesicular sulfur are transformed into $H_2S$ in the presence of hydrogen. Hydrogenation reaction in the absence of a catalyst would make it necessary to work at high temperatures, and because of this it is preferable to carry out this hydrogenation in the presence of a catalyst, thus enabling operating at lower temperatures. More precisely, the catalytic hydrogenation treatment is carried out at temperatures from about 140° to about 550° C. and preferably between about 200° C. and 400° C. The hydrogen required for the hydrogenation reaction may already be contained in the residual gas or may be formed in situ in the hydrogenation zone, for example by reaction of CO on $H_2O$ when the residual gas contains these two reactives, or otherwise may be added to the residual gas from an external hydrogen source feed. The quantity of hydrogen to be used must be sufficient to obtain a substantially complete transformation into $H_2S$ of the hydrogenable sulfur compounds or products, such as $SO_2$, COS, $CS_2$, mercaptans, vapor and/or vesicular sulfur, contained in the residual gas subjected to the hydrogenation treatment. In practice, the quantity of hydrogen used may range from 1 to 6 times the stochiometric quantity required to transform into $H_2S$ the hydrogenable sulfur products present in the residual gas.

The catalysts which can be used for the hydrogenation treatment are those which contain metals of the Va, VIa and VIII groups of the Periodic Table, for example, metal compounds such as cobalt, molybdenum, chromium, vanadium, thorium, nickel, tungsten, uranium, the said compounds being placed (or not) on a support or matrix of the silica, alumina, silica/alumina type. Particularly efficient for the hydrogenation treatment are hydrodesulfuration catalysts based on cobalt and molybdenum oxide supported on alumina. For this hydrogenation treatment, contact time between the gaseous reaction medium and the catalyst can vary fairly widely. They are preferably located between 0.5 and 5 seconds and more especially between 1 and 3 seconds.

During the second stage of the process according to the invention, the gaseous effluent issuing from the hydrogenation treatment, i.e. from the first stage of the process, is contacted with an appropriate quantity of a gas containing molecular oxygen, at a temperature comprised between 150° C. and 570° C., the said temperature being more particularly located between about 200° and 570° C. and preferably between about 250° and 570° C., in the presence of a specific oxidation catalyst, which ensures a complete conversion into $SO_2$ of $H_2S$ forming the sole sulfur product in the said effluent, and the gaseous phase resulting from this oxidation, which contains $SO_2$ as the sole sulfur compound, is thereafter rejected into the atmosphere.

The gas containing the molecular oxygen used in this second stage of the process according to the invention is generally air, although it is possible to use pure oxygen, oxygen-enriched air, or even other mixtures, in varied proportions, of oxygen and an inert gas other than nitrogen. The gas containing the oxygen is used in such a quantity that there is an oxygen quantity at least equal to and preferably higher than the stoechiometric quantity necessary for oxidation into $SO_2$ of the total $H_2S$ contained in the gaseous effluent issuing from the first stage. Advantageously, the quantity of gas containing oxygen is such that the molecular quantity of oxygen represents 1.5 to 10 times the molecular quantity of $H_2S$ to be oxidized into $SO_2$. The gaseous effluent issuing from the hydrogenation treatment and the gas containing oxygen can be brought separately into contact with the oxidation catalyst. However, with the purpose of obtaining a very homogenous reaction medium, it is preferable to mix firstly the said effluent with the gas containing oxygen and to contact the mixture thus formed with the oxidation catalyst.

For this oxidation step, contact times of the gaseous reaction medium with the oxidation catalyst may range advantageously from 0.1 to 6 seconds and preferably be comprised between 0.5 and 3 seconds.

The duration of the contact times for both the hydrogenation step and the oxidation step are expressed under the classic pressure and temperature conditions.

The porous support or matrix of the specific oxidation catalyst used in the second step of the process according to the invention is constituted, as hereinabove mentioned, by 50 to 100% by weight of at least one product selected from among titanium oxides, expressed as $TiO_2$, zirconium oxides, expressed as $ZrO_2$, silica, and zeolites, especially the faujasite, mordenite and ferrierite type, and from 50 to 0% by weight alumina.

By the expression "titanium oxide or zirconium oxide" is meant in the present disclosure a oxidized titanium or zirconium compound which according to the methods of preparation used for its obtention, can comprise titanium or zirconium dioxide or otherwise oxyhydrate type compounds.

The porous support or matrix of the oxidation catalyst presents a surface area, determined in accordance with BET method, of at least 5 $m^2/g$, especially 20 to 800 $m^2/g$ and preferably 50 to 600 $m^2/g$.

The metal compounds, that are associated to the porous support or matrix defined hereinabove, are in particular compounds, especially oxides, mineral or organic acid salts, such as sulfates, nitrates, phosphates, acetates of metals taken from group A constituted by iron, cobalt, nickel, manganese, copper, zinc and cadmium, or from group B constituted by vanadium, bismuth, chromium, molybdenum and tungsten. One or several metal compounds from group A and one or several metal compounds from group B can also be simultaneously associated to the support or matrix.

One or several metal compounds taken from group C constituted by copper, silver, molybdenum, tungsten, iron and bismuth and one or several metal compounds taken from group D constituted by lanthanides, chromium, cobalt, nickel, vanadium, tin, rhodium, palladium iridium and platinum can also be simultaneously associated to the support or matrix.

The overall quantity of the metal compound(s) which are associated to the support can represent, expressed by weight of metal 0.005 to 25% by weight of the calcinated catyst and said quantity is preferably between 0.01 and 20% of this weight.

When one or several metal compounds of group A and one or several metal compounds of group B are simultaneously associated to the support or matrix, the total number of atoms of the metal(s) of group A/total number of atoms of the metal(s) of group B ratio is comprised between 0.1 and 10.

Furthermore, when one or several metal compounds of group C and one or several metal compounds of group D are simultaneously associated to the support or matrix, the total number of atoms of the metal(s) of group C/total number of atoms of the non-precious metals of group D ratio is comprised between 0.1 and 10 whereas the total number of atoms of the metal(s) of group C/total number of atoms of the precious metal(s) of group D ratio is comprised between 20 and 1000, and preferably between 50 and 400.

Most suitable oxidation catalysts according to the invention comprise a porous support or matrix such as hereinabove defined, and particularly silica, a titanium oxide of $TiO_2$ type, titanium oxyhydrate, zirconium oxide of $ZrO_2$ type or zirconium oxyhydrate matrix presenting a specific surface of at least 5 $m^2/g$, particularly 20 to 800 $m^2/g$ and preferably 50 to 600 $m^2/g$, on which is placed an iron compound, and especially iron sulfate, in a quantity such that the weight of iron presents 0.1 to 15%, and preferably 0.5 to 10% by weight of the calcinated catalyst, the iron compound being possibly associated to a precious metal of group D, especially palladium, in a number of iron atoms/number of precious metal atoms ratio comprised between 20 and 1000 and preferably 50 and 400.

The preparation of the oxidation catalyst and that of the support of the said catalyst can be carried out using various methods known per se. For example a silica, titanium oxide or zirconium oxide support or matrix may be obtained by precipitation of a hydrogel of silica, titanium oxyhydrate or zirconium oxyhydrate from respectively sodium silicate, a titanium salt or a zirconium salt, thereafter forming the hydrogel into pellets or beads, and then drying and calcinating the pellets or beads thus obtained. A $SiO_2$, $TiO_2$ or $ZrO_2$ support or matrix may otherwise be obtained by hydrolysis of respectively $SiCl_4$, $TiCl_4$, $ZrCl_4$, pelletizing of $SiO_2$, $TiO_2$ or $ZrO_2$ formed, and drying then calcinating the pellets.

A mixed support or matrix, containing for example a titanium or zirconium oxide and/or $SiO_2$ jointly with alumina can be produced by mixing the selected oxides or again by a coprecipitation of oxides from titanium or zirconium salts and/or sodium silicate and aluminium salts. The catalyst can be obtained for example by impregnation of a selected support with one or several of the desired metal compounds, then drying of the impregnated support and calcinating the dried product at a temperature comprised especially between 350° C. and 600° C. The association of the afore-mentioned metal compound(s) with the support or matrix can also be achieved by coprecipitation techniques or otherwise by mixing the constituents of the catalyst in the form of oxides.

The process according to the invention is particularly adapted to the incineration of residual gases issuing from installations for manufacturing sulfur according to the CLAUS process, the said residual gases possibly having been furthermore subjected before incineration to a complementary purification treatment by any method known per se in order to reduce further their sulfur compounds content.

In the present description and associated claims, the expression "a low content" relating to the total content of sulfur compounds contained in the residual gas, denotes a content lower than 5% by volume.

The invention is illustrated by the following examples without in any way limiting its scope.

EXAMPLE 1

Incineration was carried out of a gaseous effluent issuing from the last catalytic converter of a CLAUS unit of a sulfur manufacture installation.

Operating proceeded in an installation comprising an in-line burner in order to reheat the effluent to be incinerated by methane combustion by means of a stoichiometric quantity of air; a catalytic hydrogenation reactor, the inlet of which was connected to the burner outlet; and a catalytic oxidation reactor in series with and downstream of the hydrogenation reactor, the oxidation reactor outlet being connected to a stack for evacuation of the gases into the atmosphere.

As hydrogenation catalyst was used a commercial catalyst in the form of beads of about 3 millimeters in diameter comprising alumina impregnated with cobalt oxide and molybdenum oxide, the said catalyst having a surface area of 248 $m^2/g$ and containing 1.75% cobalt and 8% molybdenum expressed as weight of metal/total weight of catalyst ratio.

As oxidation catalyst was used a catalyst prepared by impregnation of extrudates of porous titanium oxide, of about 4 millimeters diameter, by means of iron sulfate, the said catalyst having a surface area of 80 $m^2/g$ and containing 2% iron expressed as weight of metal/total weight of catalyst ratio (surface area of titanium oxide equal to 130 $m^2/g$).

The effluent to be incinerated, the temperature of which at the outlet of the last catalytic converter of the CLAUS unit being 150° C., was reheated to 390° C. by flow in an in-line burner and the effluent thus reheated was injected in the catalytic hydrogenation reactor with an output of 2539 $Nm^3/h$. The hydrogenation reaction occured at a temperature of 420° C. with a contact time between gas and catalyst corresponding to 1 second NTP.

The gases issuing from the hydrogenation reactor, the output of which was equal to 2525 $Nm^3/h$, were added to a quantity of air corresponding to 581 $Nm^3/h$ and the mixture thus formed was injected in the oxidation reactor at a rate of 3106 $Nm^3/h$ and at a temperature of 365° C. The contact time between the gas and the catalyst in the oxidation reactor was equal to 2 seconds NTP and the temperature of the reaction medium throughout the oxidation of $H_2S$ into $SO_2$ was equal to 540° C.

The effluent of the oxidation reactor was thereafter directed towards the stack and from there into the atmosphere.

Table I hereinafter shows the composition of gaseous effluent at various points of the incineration process.

Examination of the results of Table I shows that the catalytic incineration according to the invention enables the transformation into $SO_2$ of the totality of $H_2S$ and $CS_2$ and quasi-totality of COS present in the effluent to be incinerated (the overall yield of transformation into $SO_2$ of $H_2S$, $CS_2$ and COS compounds is higher than 99%) while operating at relatively low temperatures, in this case a maximum temperature of 540° C. during the oxidation phase into $SO_2$ of the said compounds.

To achieve a comparable transformation into $SO_2$ of $H_2S$, $CS_2$ and COS compounds while subjecting the effluent of the last CLAUS converter to a thermal incineration, it is necessary to carry out this thermal incineration at a temperature of 800° C.

TABLE I

| | Composition of effluent (% by volume) | | | |
|---|---|---|---|---|
| | Outlet of the last converter of the CLAUS unit | Outlet of the hydrogenation reactor | Inlet of the oxidation reactor | Outlet of the oxidation reactor |
| $O_2$ | | | 3.85 | 2 |
| $N_2$ | 48.1 | 50.98 | 55.93 | 56.26 |
| $H_2O$ | 30 | 29.45 | 24.31 | 25.75 |
| $H_2S$ | 0.9 | 1.41 | 1.15 | 0 |
| $H_2$ | 1.8 | 0.41 | 0.33 | 0.33 |
| $SO_2$ | 0.45 | 0 | 0 | 1.15 |
| $CO_2$ | 18 | 17.48 | 14.21 | 14.36 |
| CO | 0.6 | 0.17 | 0.14 | 0.14 |
| COS | 0.05 | 0.009 | 0.007 | 0.007 |
| $CS_2$ | 0.1 | 0 | 0 | 0 |
| $CH_4$ | | 0.09 | 0.07 | 0 |

The gaseous effluent subjected to the incineration according to the invention, the composition of which is given in Table I (outlet of the last CLAUS converter), issues from a CLAUS unit of a sulfur manufacture installation producing 1000 tons of sulfur per day. The replacement of thermal incineration of the said effluent by catalytic incineration according to the invention enables annual energy saving of 258 000 kilothermies to be achieved.

EXAMPLE 2

Operating proceeds under conditions described in Example 1, carrying out three long duration tests of catalytic incineration, changing the oxidation catalyst from test to test.

The oxidation catalysts used during the course of these tests were the following:

- Test I: Catalyst according to the invention comprising porous $TiO_2$ impregnated with iron sulfate, the said catalyst having a surface area of 78 m²/g (surface area of $TiO_2$ equal to 140 m²/g) and containing 2% iron (expressed by metal weight/total weight of catalyst ratio).
- Test II: Catalyst comprising porous non impregnated $TiO_2$ (titanium oxide is the same as that which was used to prepare the catalyst of test I).
- Test III: Catalyst comprising porous $Al_2O_3$ impregnated with iron sulfate, this catalyst having a surface area of 250 m²/g (surface area of alumina equal to 320 m²/g) and containing 4% by weight iron (expressed by metal weight/total weight of catalyst ratio).

TABLE II

| | Yield of transformation of $H_2S$ into $SO_2$ (%) | | | |
|---|---|---|---|---|
| Test No. | After 5 hours | After 500 hours | After 1000 hours | After 2000 hours |
| I | 100 | 99 | 99 | 99 |
| II | 80 | 80 | | |
| III | 94 | 87 | 85 | 83 |

In Table II here-above, the yield of transformation into $SO_2$ of $H_2S$ present in the effluent injected into the catalytic oxidation reaction is given as a function of time.

From the results given in Table II it appears that for test I (catalyst according to the invention) the yield of transformation into $SO_2$ of $H_2S$ which is qualitative at the beginning of the operating retains a level (in practice 99%) close to the quantitative yield even after 2000 hours working life.

In the case of test II the catalyst used (non impregnated $TiO_2$) gives insufficient results (80% transformation at the beginning of operating) and is not suitable for the application foreseen with regard to the restrictions imposed by the standards stipulated by the legislation as to atmospheric pollution by $H_2S$.

As regards test III, the catalyst used is not satisfactory either since although it has an acceptable activity (yield of transformation of $H_2S$ into $SO_2$ of 94%) at the beginning of the operation, this activity decreases with time and the yield of transformation of $H_2S$ into $SO_2$ is only 83% after 2000 hours working life.

EXAMPLE 3

Catalytic incineration is carried out on a gaseous effluent issuing from the complementary purification stage treating residual gases coming from a second CLAUS unit for the manufacture of sulfur.

This catalytic incineration was carried out in an installation similar to that described in Example 1 and used hydrogenation and oxidation catalysts identical to those used in the said example.

The effluent to be incinerated, the temperature of which at the outlet of the complementary purification stage was 150° C., was reheated to 330° C. by passage through an in-line burner and the thus reheated effluent was injected in the catalyst hydrogenation reactor with a rate of 2455 Nm³/h. The hydrogenation reaction occured at a temperature of 340° C. for a contact time between the gas and catalyst corresponding to 1 second NTP.

The gases issuing from the hydrogenation reactor, the rate of which was equal to 2449 Nm³/h, were added to a quantity of air corresponding to 358 Nm³/h and the mixture thus formed was injected in the oxidation reactor at a rate of 2807 Nm³/h and at a temperature of 285° C.

Contact time between the gas and catalyst in the reactor oxidation was equal to 2 seconds NTP and the temperature of the reaction medium during the oxidation of $H_2S$ into $SO_2$ was equal to 370° C.

The effluent of the oxidation reactor was thereafter directed towards the stack and from there into the atmosphere.

In Table III here-under, the composition of the gaseous effluent at various points of the incineration process is given. An examination of the results of this table III shows that the catalytic incineration according to the invention permits the transformation into $SO_2$ of the totality of $H_2S$ and $CS_2$ and quasi-totality of COS present in the effluent to be incinerated while operating at relatively low temperatures, in this case a temperature lower than a maximum of 370° C. during the oxidation into $SO_2$ in the oxidation reactor.

In order to carry out a comparable transformation into $SO_2$ of $H_2S$, $CS_2$ and COS compounds while subjecting the effluent of the complementary purification stage to a thermal incineration, it is necessary to realise this thermal incineration at a temperature of 800° C.

TABLE III

| | Composition of effluent (% by volume) | | | |
|---|---|---|---|---|
| | Outlet of the complementary purification stage | Outlet of the hydrogenation reactor | Inlet of the oxidation reactor | Outlet of the oxidation reactor |
| $O_2$ | | | 2.62 | 2 |
| $N_2$ | 49.3 | 51.23 | 54.57 | 54.66 |
| $H_2O$ | 30 | 28.92 | 25.49 | 26 |
| $H_2S$ | 0.1 | 0.36 | 0.31 | 0 |
| $H_2$ | 1.8 | 1.52 | 1.33 | 1.33 |
| $SO_2$ | 0.05 | 0 | 0 | 0.31 |

TABLE III-continued

| | Composition of effluent (% by volume) | | | |
|---|---|---|---|---|
| | Outlet of the complementary purification stage | Outlet of the hydrogenation reactor | Inlet of the oxidation reactor | Outlet of the oxidation reactor |
| $CO_2$ | 18 | 17.70 | 15.44 | 15.54 |
| CO | 0.6 | 0.17 | 0.15 | 0.15 |
| COS | 0.05 | 0.009 | 0.008 | 0.008 |
| $CS_2$ | 0.1 | 0 | 0 | 0 |
| $CH_4$ | | 0.09 | 0.08 | 0 |

The gaseous effluent subjected to the incineration according to the invention, the composition of which is given in Table III here above (outlet of the complementary purification stage) issues from the said purification stage associated to a CLAUS unit for the manufacture of sulfur producing 1000 tons of sulfur per day. Replacing thermal incineration of the said effluent by catalytic incineration according to the present example permits an annual energy saving of 333 000 kilothermies to be achieved.

EXAMPLE 4

While operating under conditions described in Example 3, three long duration catalytic incineration tests were carried out, using different oxidation catalysts for each test, as defined above.

- Test IV: Catalyst according to the invention which is identical to that of test I of Example 2.
- Test V: Catalyst identical to that of Test II of Example 2.
- Test VI: Catalyst identical to that of test III of Example 2.

In Table IV here under the yield of transformation into $SO_2$ of $H_2S$ present in the effluent injected in the catalytic oxidation reactor is given as a function of time.

Again it appears that for test IV (catalyst according to the invention) the yield of transformation into $SO_2$ of $H_2S$, which is quantitative at the beginning of the operation retains a level (in practice 99%) close to the quantitative yield even after 2000 hours working life.

TABLE IV

| | Yield of transformation of $H_2S$ into $SO_2$ (%) | | | |
|---|---|---|---|---|
| Test No. | After 5 hours | After 500 hours | After 1000 hours | After 2000 hours |
| IV | 100 | 99 | 99 | 99 |
| V | 80 | | | |
| VI | 96 | 90 | 87 | 84 |

In the case of test V, the catalyst used ($TiO_2$ alone) gives insufficient results (80% transformation of $H_2S$ into $SO_2$) for the foreseen application.

With regard to test VI, the catalyst used is not satisfactory either since its activity, while acceptable in the beginning, decreases with time; the yield of transformation of $H_2S$ into $SO_2$ is only 84% after 2000 hours working life.

EXAMPLE 5

Operating was carried out under conditions of Example 3, but using, an oxidation catalyst formed of a support or matrix containing by weight, 70% of porous $TiO_2$ and 30% porous $Al_2O_3$, and impregnating this matrix with an iron sulfate. The said catalyst had a surface area of 120 m$^2$/g (surface area of the support or matrix equal to 125 m$^2$/g) and containing 4% by weight iron (expressed by metal weight/total catalyst weight ratio).

The yield of transformation of $SO_2$ into $H_2S$ present in the effluent injected in the oxidation reactor, which was quantitative at the beginning of the operation, was still equal to 98% after 500 hours working life.

EXAMPLE 6

Three catalytic incineration tests were carried out, operating as described in Example 3, but while replacing in each test the oxidation catalyst based on a titanium oxide support by an oxidation catalyst based on a silica support.

The oxidation catalysts used during the tests were the following:

- Test VII: Catalyst according to the invention comprising porous silica impregnated with iron sulfate, the said catalyst having a surface area of 137 m$^2$/g (surface area of silica equal to 180 m$^2$/g) and containing 3.9% by weight of iron (with respect to the total weight of the catalyst).

TABLE V

| | Yield of transformation of $H_2S$ into $SO_2$ (%) | | | | |
|---|---|---|---|---|---|
| Test No. | After 5 hours | After 50 hours | After 100 hours | After 300 hours | After 500 hours |
| VII | 99.8 | 99.8 | 99.7 | 99.5 | 99.4 |
| VIII | 99.5 | 99.4 | 99.2 | 99 | 99 |
| IX | 78.9 | 78.8 | | | |

- Test VIII: Catalyst according to the invention comprising porous silica impregnated with iron sulfate, the said catalyst having a surface area of 343 m$^2$/g (surface area of silica equal to 500 m$^2$/g) and containing 4.15% by weight of iron (with respect to the total weight of the catalyst).
- Test IX: Non impregnated silica having a surface area of 500 m$^2$/g (silica identical to that constituting the catalyst support of test VIII).

In Table V here-above, the transformation into $SO_2$ of $H_2S$ present in the effluent injected in the oxidation reaction is given as a function of time.

EXAMPLE 7

A series of catalytic incineration tests were carried out, operating as described in Example 3, but while using for each test an oxidation catalyst according to the invention but different from those of Example 3.

The oxidation catalysts used during these tests were the following:

- Test X: Catalyst obtained by impregnation of extrudates (about 4 mm diameter) of titanium oxide (surface area equal to 130 m$^2$/g) firstly by an iron sulfate solution, then after calcination at 400° C., by a palladium chloride solution, drying at 110° C. and calcination at 350° C. The catalyst has a surface area of 104 m$^2$/g and contains 3.9% by weight iron and palladium (atomic ratio Fe/Pd=200).
- Test XI: Catalyst obtained by impregnation of a silica support (surface area equal to 480 m$^2$/g) with the use of a cuprous chloride solution, then drying at 110° C. and calcination at 450° C. The catalyst contained 4% by weight of copper and had a surface area equal to 380 m$^2$/g.
- Test XII: Catalyst obtained by impregnation of a silica support (surface area equal to 480 m$^2$/g) with the use of an ammonium paramolybdate solution, then drying at 110° C. and calcination at 450° C. The obtained catalyst contains 8.4% by weight of molybdenum and presents a surface area of 370 m²/g.

- Test XIII: Catalyst obtained by impregnation of a zirconium oxide support (surface area equal to 82 m²/g) with the use of an iron sulfate solution, then drying at 150° C. and calcination at 450° C. The catalyst contained 1.8% by weight of iron and presents a surface area of 76 m²/g.

In all these tests the yield of transformation into SO₂ of H₂S present in the gaseous effluent injected in the oxidation reactor was higher than 99%.

EXAMPLE 8

Catalytic incineration was carried out on a sulfurous residual gas having the following composition in percentage by volume:

| H₂S = 0.08% | COS = 0.03% | CO₂ = 15% |
|---|---|---|
| SO₂ = 0.04% | H₂ = 2% | H₂O = 30% |
| CS₂ = 0.05% | CO = 0.50% | N₂ = 52.30% |

This catalytic incineration was carried out in an installation identical to that described in Example 1.

The residual gas to be incinerated, the temperature of which was equal to 150° C., was reheated and catalytically hydrogenated as described in Example 3.

The gases issuing from the hydrogenation reactor were added to a quantity of air corresponding to 2% by volume of oxygen and the mixture thus formed was injected in the oxidation reactor. The contact time between the gas and catalyst in the oxidation reactor was equal to 2 seconds NTP and the temperature of the reaction medium during the oxidation of H₂S into SO₂ was equal to 350° C.

The oxidation catalyst consisted of a porous silica (surface area equal to 180 m²/g) in the form of beads of 4 to 6 mm diameter, impregnated with iron sulfate and a palladium salt corresponding to an iron weight content of 4% and a palladium weight content of 200 ppm.

The effluent of the oxidation reactor contained only 2 to 3 ppm of H₂S and 0.04% of CO, the totality of COS, CS₂ and H₂ having been eliminated.

Naturally, this invention is in no way confined to the Examples and embodiments described above; many variant forms are possible for someone skilled in the art, depending on applications, and without any departure from the spirit of the invention.

What is claimed is:

1. A process for the catalytic incineration of residual gases containing a low content of at least one sulfur compound selected from COS, CS₂ and mercaptans, comprising: hydrogenating the residual gas to react said sulfur compound contained therein to form H₂S; and contacting the hydrogenated residual gas with an oxygen-containing gas in the presence of an oxidation catalyst at a temperature between about 150° C. and 570° C. to thereby oxidize H₂S to SO₂, wherein the oxidation catalyst comprises a porous support having a surface area of at least 5 m²/g consisting essentially of from about 50 to 100% by weight of at least one composition selected from the group consisting of titanium oxides expressed as TiO₂, zirconium oxides expressed as ZrO₂, silica, zeolites and mixtures thereof and from 50 to 0% by weight alumina, and iron sulphate in an amount such that the iron content of the catalyst is between about 0.1 and 15% by weight.

2. A process according to claim 1, wherein the oxidation catalyst support has a surface area ranging from 20 m²/g to 800 m²/g.

3. A process according to claim 1, wherein the oxidation catalyst support has a surface area ranging from 50 m²/g to 600 m²/g.

4. A process according to claim 1, wherein the iron content of the catalyst is between 0.5 and 10% by weight.

5. A process according to claim 1, wherein the oxidation catalyst support is selected from the group consisting of silica, titanium oxide, and zirconium oxide.

6. A process according to claim 1, wherein the residual gas to be incinerated is a residual gas from a Claus sulfur manufacturing plant, said residual gas having been treated to reduce its sulfur compound content.

7. A process according to claim 1 wherein the residual gas additionally contains at least one sulfur containing composition selected from H₂S, SO₂ and sulfur.

8. A process for the catalytic incineration of residual gases containing a low content of at least one sulfur compound selected from COS, CS₂ and mercaptans, comprising: hydrogenating the residual gas to react said sulfur compound contained therein to form H₂S; and contacting the hydrogenated residual gas with an oxygen-containing gas in the presence of an oxidation catalyst at a temperature between about 150° C. and 570° C. to thereby oxidize H₂S to SO₂, wherein the oxidation catalyst comprises a porous support having a surface area of at least 5 m²/g consisting essentially of from 50 to 100% by weight of at least one composition selected from the group consisting of titanium oxides expressed as TiO₂, zirconium oxides expressed as ZrO₂, silica, zeolites and mixtures thereof and from 50 to 0% by weight alumina, an iron compound and at least one compound of a precious metal selected from the group consisting of rhodium, palladium, iridium, and platinum, in an amount such that the iron content of the catalyst is between 0.1 and 15% by weight and that the ratio of the number of iron atoms to the number of precious metal atoms is between 20 and 1,000.

9. A process according to claim 8, wherein the oxidation catalyst support has a surface area ranging from 20 m²/g to 800 m²/g.

10. A process according to claim 8, wherein the oxidation catalyst support has a surface area ranging from 50 m²/g to 600 m²/g.

11. A process according to claim 8, wherein the oxidation catalyst support is selected from the group consisting of silica, titanium oxide, zirconium oxide and a mixture thereof.

12. A process to claim 8, wherein the iron compound is iron sulphate.

13. A process according to claim 8, wherein the precious metal is palladium.

14. A process according to claim 8, wherein the ratio of the number of iron atoms to the number of precious metal atoms is between 50 and 400.

15. A process according to claim 8, wherein the iron content of the oxidation catalyst is between 0.5 to 10% by weight.

16. A process according to claim 8, wherein the residual gas to be incinerated is a residual gas from a Claus sulfur manufacturing plant, said residual gas having been treated to reduce its sulfur compound content.

17. A process according to claim 8, wherein the residual gas additionally contains at least one sulfur composition selected from H₂S, SO₂ and sulfur.

* * * * *

UNITED STATES PATENT AND TRADEMARK OFFICE
CERTIFICATE OF CORRECTION

PATENT NO. : 4,399,112

DATED : August 16, 1983

INVENTOR(S) : Robert Voirin

It is certified that error appears in the above-identified patent and that said Letters Patent is hereby corrected as shown below:

The name of the assignee should read as follows:
    --Societe Nationale elf aquitaine (Production)--

In the title, sixth line, replace "POSSIBILITY" by --POSSIBLY-- and after "GROUP" in the seventh line, insert --... FORMED FROM $H_2S$, $SO_2$, VAPOR AND/OR VESICULAR SULFUR--

Column 1, line 23: insert --of-- between "unit" and "sulfur"

Column 3, line 32: change "stochiometric" to --stoichiometric--

Column 4, line 63: change "catayst" to --catalyst--

Column 10, line 3: the expression "transformation of $SO_2$ into $H_2S$" should be --transformation into $SO_2$ of $H_2S$--

Signed and Sealed this

Seventeenth Day of April 1984

[SEAL]

Attest:

GERALD J. MOSSINGHOFF

Attesting Officer

Commissioner of Patents and Trademarks